United States Patent [19]

Kralowetz et al.

[11] 4,387,327
[45] Jun. 7, 1983

[54] NUMERICAL CONTROL SYSTEM FOR A CRANKSHAFT MILLING MACHINE INTEGRAL INTERPOLATORS

[75] Inventors: Johanna Kralowetz; Robert Kralowetz, both of Steyr, Austria

[73] Assignee: GFM Gesellschaft für Fertigungstechnik und Maschinebau Aktiengesellschaft, Steyr, Austria

[21] Appl. No.: 175,506

[22] Filed: Aug. 5, 1980

Related U.S. Application Data

[63] Continuation of Ser. No. 919,764, Jun. 28, 1978, abandoned.

[30] Foreign Application Priority Data

Jul. 4, 1977 [AT] Austria ................................. 4734/77

[51] Int. Cl.³ ............................................. G06F 15/46
[52] U.S. Cl. .......................................... 318/573; 82/9; 364/702; 364/723
[58] Field of Search ...................... 318/571, 573, 574; 82/9; 29/6; 364/702, 723

[56] References Cited

U.S. PATENT DOCUMENTS

| | | | |
|---|---|---|---|
| 3,882,304 | 5/1975 | Walters | 364/723 |
| 3,941,987 | 3/1976 | Tack, Jr. | 318/571 |
| 3,969,615 | 7/1976 | Bowers et al. | 318/573 |
| 4,059,746 | 11/1977 | Haga | 318/573 |
| 4,061,907 | 12/1977 | Okamoto et al. | 318/573 |

Primary Examiner—B. Dobeck
Attorney, Agent, or Firm—Kurt Kelman

[57] ABSTRACT

Serving to control at least two pulse-controlled drive means for moving a tool along respective coordinate axes, the control system comprises input means for presenting workpiece data and tool data; an arithmetic unit for processing said workpiece data and tool data presented by said input means and for providing section end point data which are related to said coordinate axes and define section end point positions of said tool on a path along which the tool is to be moved by said drive means; clock means operable to produce clock signals at a plurality of clock frequencies; and interpolating means arranged to receive said section end point data and clock signals and to deliver speed control pulses to each of said drive means to cause said drive means to move said tool between successive ones of said section end point positions along path sections having predetermined configurations. The arithmetic unit and interpolating means are comprised in a computer, which is operable in accordance with a fixed program for delivering direction control signals to each of said drive means and for determining the operation of said arithmetic unit to process said workpiece data and tool data, the operation of said interpolating means to determine the configuration of each of said path sections and the delivery of said speed control pulses to each of said drive means at the frequency of a selected one of said clock signals.

8 Claims, 5 Drawing Figures

NUMERICAL CONTROL SYSTEM FOR A CRANKSHAFT MILLING MACHINE INTEGRAL INTERPOLATORS

This application is a continuation of application Ser. No. 919,764, filed June 28, 1978 now abandoned.

BACKGROUND OF THE INVENTION

This invention relates to a numerical path control system for a machinetool, particularly for a crankshaft-milling machine, which control system comprises at least two pulse-controlled drive means for moving a tool along respective coordinate axes; and arithmetic unit, which in dependence on tool data and workpiece data provides section end point data indicating the ends of sections of a path along which a tool is to be moved, and change point data, which indicate change point positions at which the speed and/or the direction of movement of the tool is to be changed, which section end point data and change point position data are related to said coordinate axes; and interpolators, which in dependence on said input data and the computed section end point data control the drive means to move the tool along a path deliver control pulses at a clock frequency which has been selected for the path section along which the tool is being moved and controls the driving speed.

When it is desired, e.g., to use an internal milling cutter to machine the crankpin of a crankshaft, it is necessary first to move the milling tool into engagement with the crankpin and then to move the milling tool around the crankpin so that the tool can recess the crankpin along a straight path which is inclined at the position angle of the crankpin. This path is succeeded by a circular path for the actual machining. In such case the tool path depends not only on the dimensions of the tool but also on the desired dimensions of the workpiece so that the actual course of the tool path can be determined for each workpiece of a given kind by a certain sequence of arithmetic operations, in which dimensions of the tool and workpiece data taken from a drawing have been taken into account. This fact is utilized in known control systems for shaft-milling machines in that a suitable computer is provided with intermediate storage means. Because the tool is usually moved along its path at different speeds during recessing and during the subsequent machining, such computer can be used to determine the positions at which the speed and direction of movement are changed if it is fed with input data representing the extents of movement in the several speed stages, for recessing, for creeping. In that case, the drive means for moving the tool along respective coordinate axes can be controlled in dependence on the computed path position data, which are related to the coordinate axes. For this purpose, separate interpolators are provided for each path section having a given configuration, and these interpolators deliver suitable control pulses to the drive means. The configuration of the path section will then depend on the distribution of the drive control pulses between the coordinate axes and the speed of the tool will depend on the frequency of the control pulses. The interpolators can control the drive means only to move the tool along a path having a predetermined confoguration, e.g., an arc of a circle or a straight line, and the extent of the movement along the path is determined by the feed data or by the data which have been determined by the computer. These interpolators are relatively expensive and must be provided with a clock system for the several interpolator sections so that the control pulses can be delivered in steps to the drive means for the movement along one coordinate axis or the other when the deviation from the desired value has reached the limit which calls for a change over to the movement along the other coordinate axis. Such clock systems can easily be deranged and the actual value must also be compared for a check of the tool movement.

The known control system are expensive and liable to be deranged and the provision of separate interpolators for every path configuration results in a discontinuity at the point where a change is effected from one path configuration to another. That discontinuity reduces the precision of the machining operation. Besides, the known control systems cannot correct defects of the machine tool, e.g., the backlash which occurs during the change of direction of a coordinate drive means during the interpolation of a circle.

SUMMARY OF THE INVENTION

It is the object of the invention to eliminate these disadvantages and to provide a machine tool, particularly for a crankshaft-milling machine, a numerical path control system which is structurally simple and reliable in operation and which permits of a correction of flat portions which are due to change-over backlash and enables a gradual transition between two curved path configurations.

In a numerical path control system of the kind first described hereinbefore, this object is accomplished according to the invention in that the arithmetic unit and the interpolator are comprised in a computer, which in accordance with a fixed program delivers control pulses and direction signals at a clock frequency which in dependence on the program is selected from preselected clock frequencies. This implementation fulfills another object of the invention, namely to obtain accurate control of the tool parts independent of the speed of the tool movement.

It is a further object of the invention that the accuracy of the tool parts is determined as accurately as desired, and is only dependent on the incremental advancement steps in the X and Y direction.

It is still an additional object of the invention to permit selection of either an open-loop or a closed-loop mode of operation.

It is a further object of the invention that the tool drive must be capable of being resumed in the event of any interruption of the drive of the tool, without the accuracy of the tool path being compromised.

By means of the computer, both the required arithmetic operations and the interpolating steps can be performed by a system which involves only a small expenditure, and if a suitable program is used the control pulses required for the coordinate drive means can be provided at the output of the computer. It is thus a further object of the invention that the interpolator, a part of the computer, is not bound to a preset type of curve, but that the shape of the curve may be changed. Computers have previously been used as versatile means for performing arithmetic operations, the computer is now used as a controller so that the result of arithmetic operations is not longer required and there is no longer a need for separate interpolators, which are expensive, are subject to disturbances are malfunction and are not adjustable. Th computer operates in accordance with a fixed program so that it is sufficient to provide it with tool and workpiece input data by means of decade switches, punched tapes or magnetic tapes. A control of the computer by the operator of the machine-tool is neither required nor intended, although a manual override control is provided.

Owing to its capabilities, the computer can take into account also defects which are inherent in the machine, e.g., during the reversal of the drive means, because these defects can be allowed for in the program of the computer. Besides, the arithmetic capabilities of the computer permit control of various tool path configurations without the need for a special expenditure for interpolation. For this reason such computerized control systems according to the invention can be used even for gradual transitions from a path section having a predetermined geometric configuration to a succeeding path section having a different geometric configuration. To operate as a controller, the computer must deliver the control pulses at a frequency which is independent of the speed at which the arithmetic operations are performed. For this reason the control pulses must be delivered at a predetermined clock frequency, which in dependence on the program of the computer is selected by the latter from a plurality of frequencies, which determine different speeds.

DESCRIPTION OF THE DRAWING

The subject matter is diagrammatically illustrated in FIG. 1 of the accompanying drawing, which is a block diagram showing a tool path control system according to the invention for a crankshaft-milling machine.

DESCRIPTION OF THE PREFERRED EMBODIMENT

Figure 1:
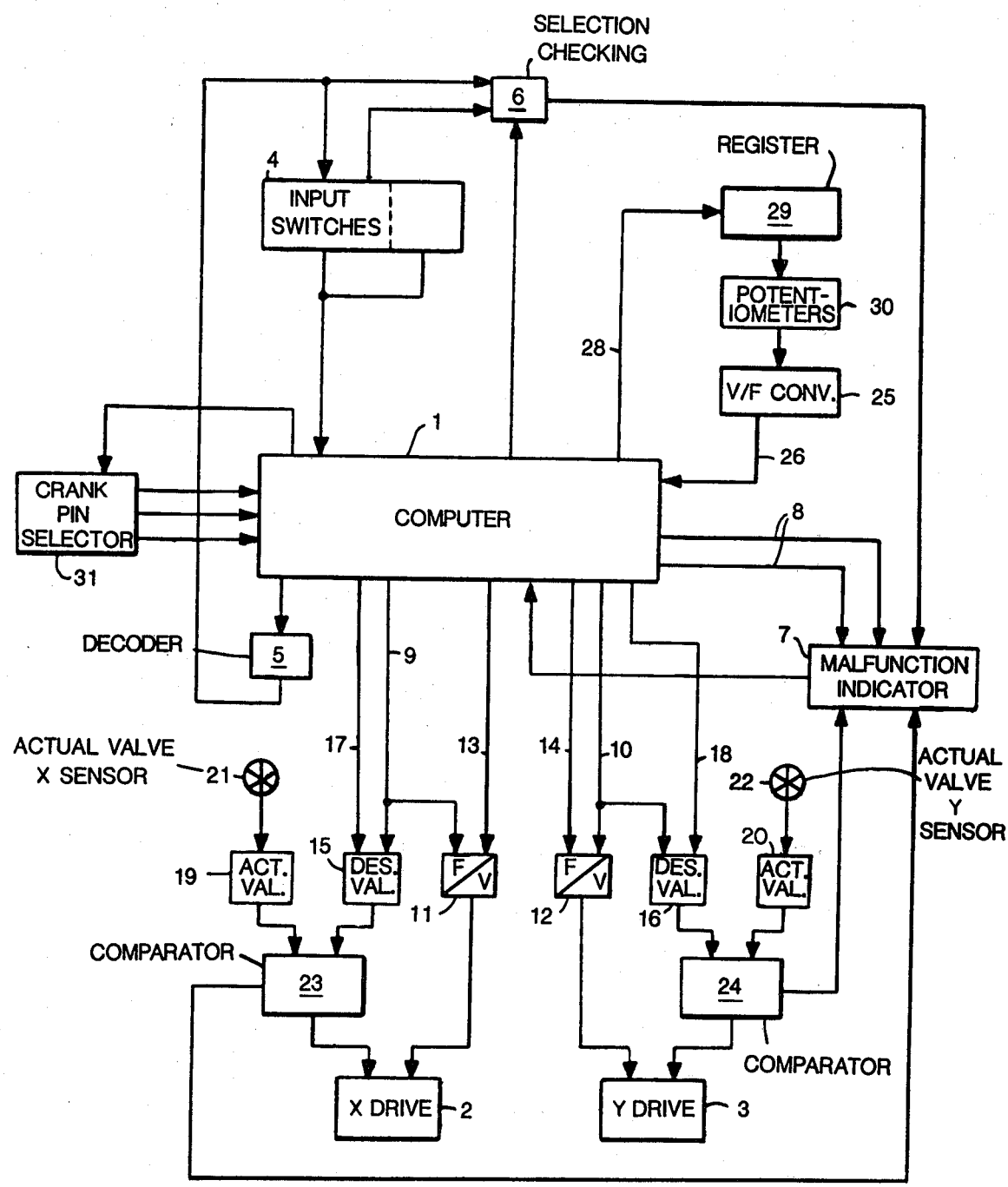

By means of the control system which is shown, the tool of a machine tool, such as a crankshaft-milling machine, can be controlled along the two coordinate axes x and y, which extend at right angles to each other in a plane which is at right angles to the axis of the crankshaft. An essential component of that control system consists of a computer 1, which operates in accordance with a fixed program and causes the milling cutter to be moved along a predetermined path by drive means 2 and 3 for moving the milling cutter along the axes x and y, respectively. The dimensions of the tool path depend on the dimensions of the tool and of the workpiece. Corresponding input data are fed into the computer 1 by means of input switches 4 or by a punched tape or plug-in cards. Decade switches afford the advantage that the workpiece data taken from a drawing can be directly set. Based on these input data, the computer 1 computes and stores the data indicating change point positions and section end point positions. For this purpose the set values must be successively read into the computer 1. This operation is controlled by the computer 1 by means of a decoder 5. A selection-checking device 6 is also operated by the computer 1 to check the proper performance of the read-in operation and to cause, in case of an error, a malfunction indicator 7 to restore the computer to its initial state. That malfunction indicator will also be operated when the several data are inconsistent with each other or with certain marginal conditions. Corresponding messages are transmitted via leads 8 to the malfunction indicator 7 and the latter then restores the computer 1 to its initial state. When no signals are transmitted via leads 8, the predetermined control program is initiated. When the required data have been read into the computer, the input switches can be set to new input values when this is desired.

From the data which have been read into the computer 1, the latter computes in accordance with its program the path along which the tool is to be moved. In accordance with the result of these arithmetic operations the computer delivers control pulses to the x-axis drive means 2 and the y-axis drive means 3. These pulses are transmitted by leads 9 and 10, respectively, to frequency-to-voltage converters 11 and 12. The output voltages of these converters control the speed of the drive means 2 and 3, respectively. In addition to the speed, the direction of movement must be controlled. This is accomplished by corresponding control signals delivered by the computer 1 via leads 13 and 14. Because for the purposes of the control, the path along which the tool is to be moved is divided into straight and circular arcuate sections, which are consecutively traversed by the tool, the desired position of the milling cutter can be determined in an open-loop mode if the control pulses for the x-axis and y-axis-drive means are counted whereas the actual position of the milling cutter need not be known. This is due to the fact that each control pulse corresponds to a predetermined travel along the respective coordinate axis. For this reason, desired-value counters 15 and 16 are associated with the respective coordinate axes and are controlled by the computer via leads 17 and 18, respectively, to count in a sense which depends on the direction of movement. For this reason in the open-loop mode the drive means 2 and 3 can resume moving the machine tool 1 following interruption of the control pulses to the drive means 2 and 3, without causing any disturbance of the tool movement in accordance with the program, as the actual position of the machine tool 1 need not be known in the open-loop mode, while in a substantially closed-loop mode; the counts of the desired-value counters 15 and 16 can be directly compared with the counts of respective actual-value counters 19 and 20, which are connected to corresponding actual-value sensors, 21 and 22. Differences detected in comparators 23 and 24 can be used for an additional control of the drive means 2 and 3 in the afore-described closed-loop mode; Besides, the malfunction indicator can be operated by the comparators 23 and 24 if the differences exceed certain limits.

Because it is desired to move the tool along the different path sections at different speeds, it must be possible to control the frequency at which the pulses are delivered by the computer 1 independently of the speed at which the computer performs its arithmetic operations. For this purpose, the computer 1 is fed with certain clock frequencies, which in the present embodiment are controlled by a voltage-to-frequency converter 25. These clock frequencies are fed to the computer 1 by a lead 26 and determine the frequency at which the control pulses are delivered. As certain speeds are associated with certain path sections, the computer must compute the positions at which the speed is changed, in accordance with the input data. When such computed change position has been reached, selection signal is transmitted via lead 28 to initiate the operation of a register 29 so that the latter causes the voltage-to-frequency converter to change the clock frequencies. The several speeds can be set in a simple manner by means of potentiometers 30 and can be changed even during the machining operations if this is required for a proper machining sequence.

When it is desired to machine shafts having a plurality of crankpins, the control operations can be simplified by the use of a crankpin selector 31, which can deliver suitable signals, such as "new crankpin", "initiate recessing" and "crankshaft completed", to the computer 1. Errors can again to avoided if means for delivering acknowledgement signals are provided.

The control system which has been described is structurally simple. A special advantage afforded by the invention resides in that the use of a computer doest not require the operator of the control system to perform manual operations differing from those required where the known numerical control systems are used because the conversational mode of operation otherwise usual with a computer has been intentionally prevented. For this reason even a basic knowledge concerning the computer is not required for the operation of the control system so that errors which might be due to errors in the control of a computer by an operator are precluded. Calculations performed by the computer and programs therefor.

In the prior art, the workpiece and tool data sets and the feed rate sets for the whole crankshaft are read into a computer controlling a numerical control system to a machine tool. The program is processed block by block, where each block defines the geometric data set and the feed rate data set that should be applied to the next pin milled, as well as the angular position of the pin and auxiliary functions.

In the present invention the computer also accepts workpiece and tool data as well as a set of feed rates.

According to the technology of milling a crankshaft with a certain type of machine (for a crankshaft milling or grinding machine with an inside cutter and a stationary crankshaft) the following calculations are made:

(A) The distance to drive under a given plunge cut angle until the cutter might touch the workpiece=-length of the section to go with rapid traverse. For this the following values are needed:
  (a) the desired length of the section to go with feed rate 1 given;
  (b) the desired length of the section to go with feed rate 2 given;
  (c) the necessary distance to slow down at the end of the linear-interpolated movement (creep speed distance)—which depends on the characteristic of the drive system and of the dynamic of the machine is read in from switches once set for each machine;
  (d) the necessary distance to stop the linear movement (prestop distance) before touching the desired surface of the crankshaft-pin and before starting the circular-interpolated movement of the tool around the pin of the crankshaft, which depends on the geometric circumstances of the actual work process and the dynamic behavior of the machine and the drive system. The calculations are:
    1. cutter radius−pin radius+stroke radius=-plunge cut length
    2. plunge cut length−prestop dist (d)=length of linear interpolated path
    3. result under (2) minus creep speed distance (c)−feed rate length (b)=feed rate length (a)=-length of section going in rapid traverse 4. evaluation of sine and cosine of given plunge cut angle The type of linear interpolation installed is not operating with coordinates X and Y, but only with sine and cosine functions. The number of interpolation loops is identical to the distance performed on the path. Therefore, only distances have to be calculated to know the switch-points for feed rates and the end point of the interpolation. The computer selects on an external digital-to-frequency conversion logic the feed rate desired, and is therefore able to determine if a feed rate should be changed at once, or if it should be done, for example, in steps. In this mode, the pulses with a preselected frequency are inputs to the computer. Each of the pulses initiates an interpolation loop wherein the decision is made if X or Y, or both, have to go one distance unit ($=10^{-5}$ m, sometimes $10^{-6}$ m). According to this result, the computer creates a control pulse of programmed width on the output for X- or Y-axis or on both.

(b) The prestop distance is split into its X and Y components. According to the length of these components and the geometry of the circular path which it has to meet tangentially, an intermediate curve is defined by the computer program accumulator to conditions. The reason for this intermediate movement is the ability to change the direction of an axis (one axis always has to change direction when changing from a linear movement into a circular movement) before the desired surface of the pin is reached, in order to avoid any flat spots on the final surface. The same result would be obtained if the movement would be stopped before the direction change because too many cutting blades would cut on the same spot of the pin without exerting any pressure against the pin.

Several other reasons exist why the shape of the intermediate path, its length and the feed rate in this section, is of great importance to reach the best quality of the milled crankshaft. Details are not provided here how this section of the path is operated on, and what sophisticated know how stands behind it, since this is not the subject of the invention. It is simply mentioned that this section is a separate type of interpolation, enabling the computer program to select this path according to the geometry of the actual milled pin of the crankshaft milled.

(C) For the circular movement, the following calculations have to be made:
  (a) cutter radius−pin radius=radius of the circle
  (b) start values for the interpolation according to the angle under which the intermediate path meets the circle programmed by circular interpolation without any output ("dry interpolation")
  (c) bow-length of the circular path
  (d) bow-length for each feed rate (usually R. /6 i.e. 12 feed rates along the circle
  (e) necessary low length for creep speed to slow down just enough to be able to leave the circular path without causing any problems for the drive which has to change direction (one drive always has to change direction) and to retract the cutter from the workpiece as fast as possible, which depends on the value of the last feed rate, and on the dynamic performance of the type of machine and type of drive system.
  (f) the remaining bow length for the last feed rate in order to perform creep speed section (e)

(g) bow length (d) − creep speed length (3) = bow length for last feed rate.

If a second circular movement around the pin is desired, which is indicated by the input data, the radius of the second circle is calculated from the radius difference between first and second circle (also given by input data).

In this case point (e) and (f) are—for the first circle and calculations (b), (c) and (e) are made for the second circle. In addition (g) an earlier end for the circular interpolation of the first circle will be calculated, in order to start an intermediate path early enough to reach the second circle at the desired point (defined by the plunge cut angle).

(h) The second circle can be milled with one feed rate, because the quantity of material that has to be removed is constant along the whole path, therefore the calculation total bow length − creep speed length = bow length for constant feed rate is performed.

The type of circular interpolation installed operates the way that one interpolation loop performs one distance unit on the bow (average). This means each pulse of the generated frequency relates to one distance unit on the bow which leads to the ability to perform a real-time-interpolation. This is important, because the correction circuity for the drive voltage is able to hold the drives at any time on the desired path with a minimum of deviation (f.i. "following error").

If a second circle is desired an intermediate path for a smooth transition from one circle to the other is calculated in a way to touch the second circle almost tangentially. The method how to perform this section is similar to what has been stated under (B) except that it is not necessarily required that any axis has to change direction, and the shape of this path can influence the tool life time tremendously. Furthermore, the shape of the intermediate path depends on the plunge cut angle, and the radius-difference between the two circles.

The start and ready commands are checked and milling is started according to flow chart diagram.

Figure 2:
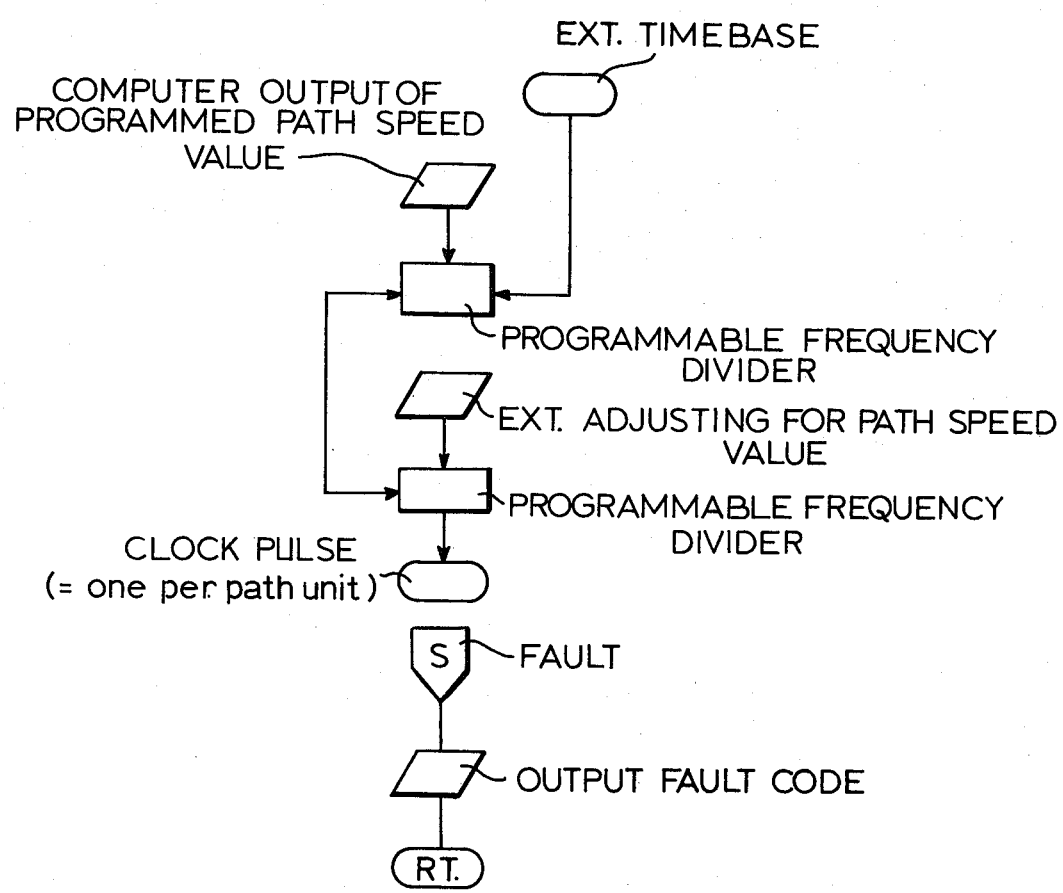
FIGS. 2, 3, 4 and 5 show typical computer programs used in operating the numerically controlled system of the present invention.
Figure 3:
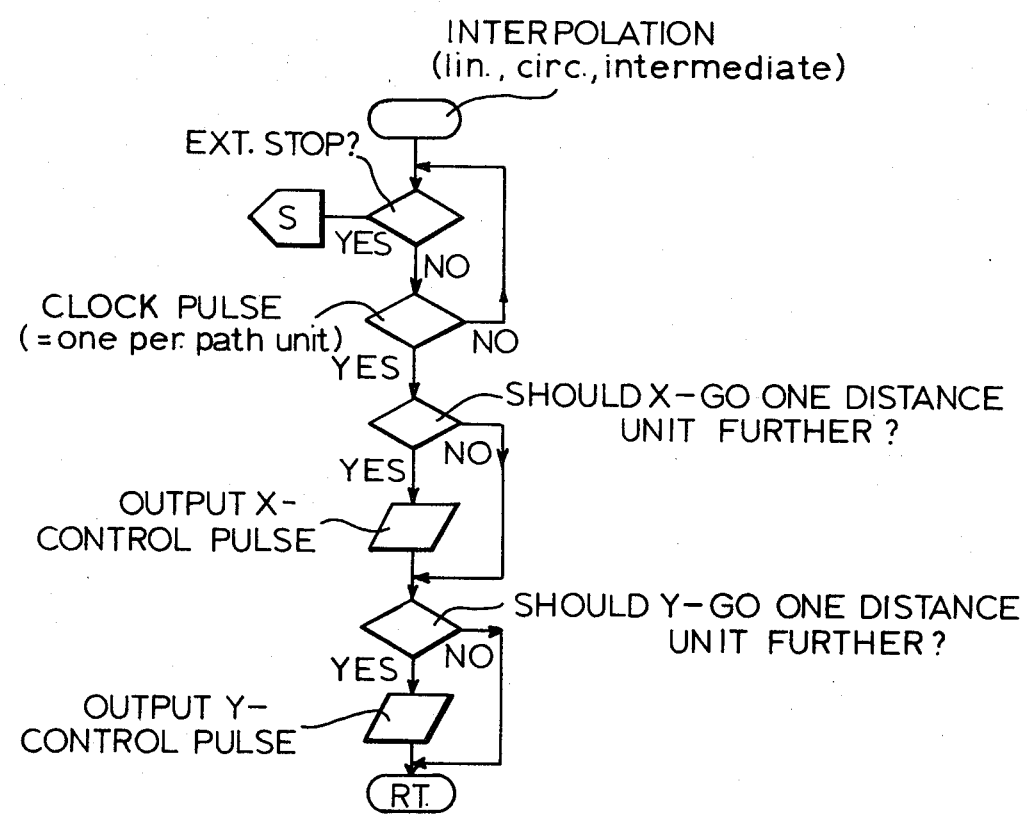
Figure 4:
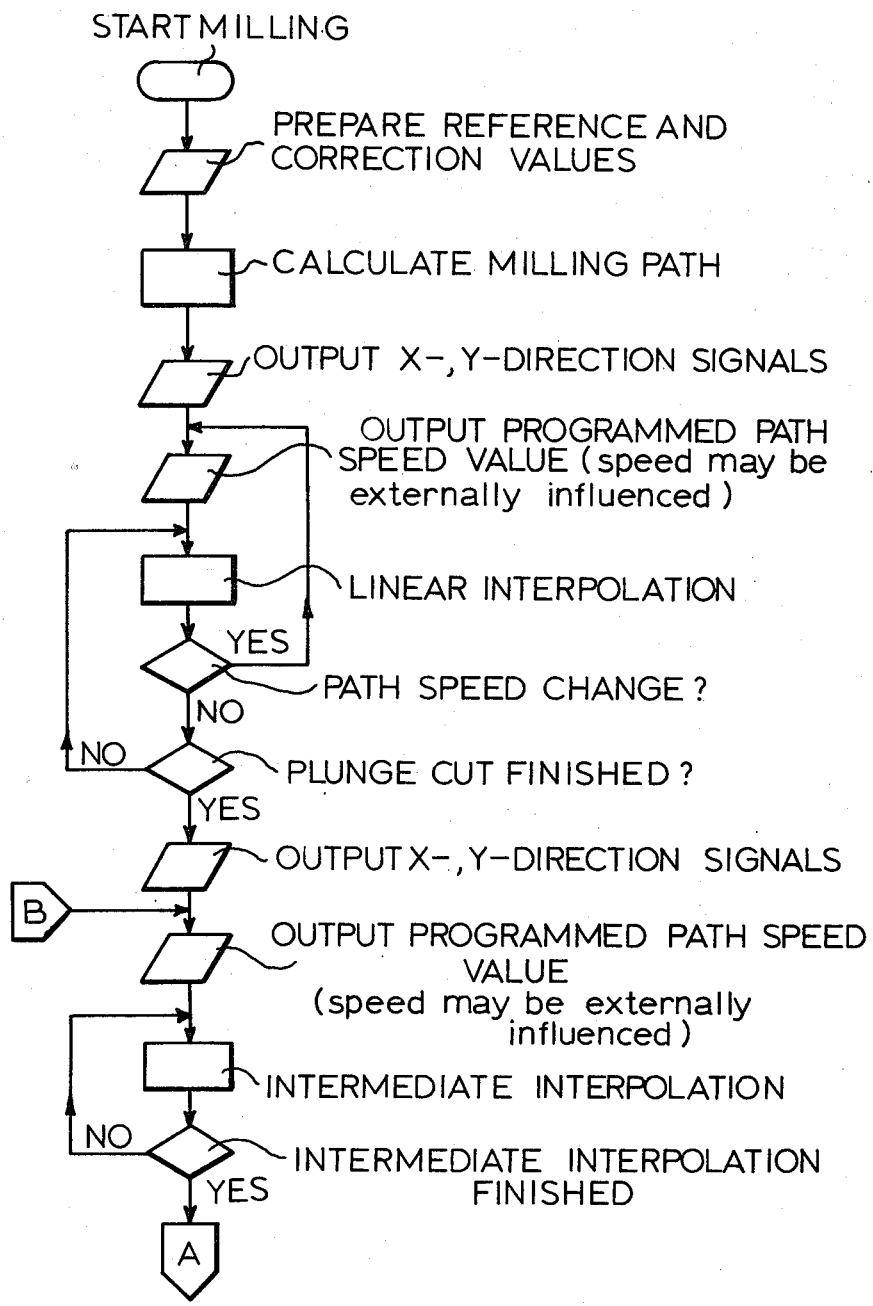
Figure 5:
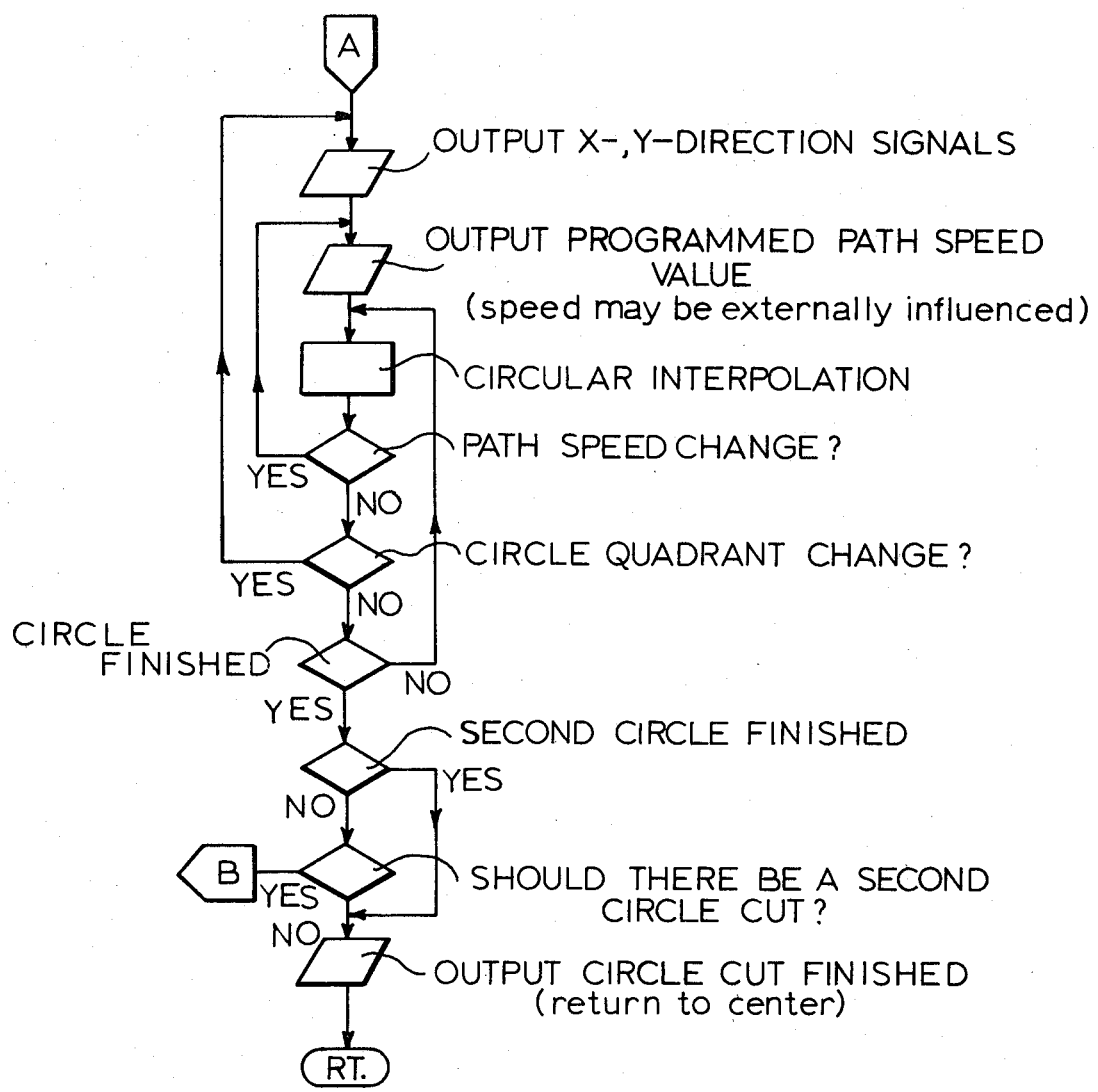

FIGS. 2, 3, 4 and 5 show typical flow charts for the computer, which are self-explanatory.

What is claimed is:

1. A numerical control system for controlling at least two pulse-controlled drive means for moving a tool at a system-selectable speed along a pair of coordinate axis in a crankshaft milling machine, said control system comprising:
    (a) input means for presenting workpiece data and tool data;
    (b) a tool speed clock operating at a particular one of a plurality of clock frequencies, wherein each of said plurality of clock frequencies corresponds to a predetermined specific frequency, and said one particular frequency is selected by said control system in response to a selection signal;
    (c) a computer operable in accordance with a fixed program and having as integral portions thereof;
    (d) an arithmetic unit operable under control of said program for processing said workpiece data and tool data, and for providing section end point data which are related to said coordinate axes for operating said tool by said drive means so as to position it along a path in dependence of said data, and for providing change point positions requiring changes in speed and direction of said tool along at least one of said coordinate axes;
    (e) selection means operable under control of said program for furnishing said selection signal to said tool speed clock at said provided change point positions; and
    (f) interpolating means wholly implemented within said computer and operable under control of said program and arranged to receive said section end point data and said selected one particular frequency and to deliver speed control pulses to each of said drive means to cause said drive means to move said tool at a speed corresponding to said selected one particular frequency substantially between successive ones of said section end positions along path sections having predetermined configurations, including means for moving said tool in a gradual transition path from a path section having a predetermined geometric configuration to a succeeding path section having a different geometric configuration so as to correct any undesired straight path portion due to said defects in said drive means.

2. The numerical control system of claim 1 wherein said tool speed clock further comprises:
    (a) register means for accepting said selection signal and for producing an analog control voltage corresponding thereto;
    (b) voltage to frequency conversion means for converting said analog control voltage into said one particular frequency.

3. The numerical control system of claim 2 wherein said register means is a digital register and said selection signal is one of a predetermined number of specific digital codes.

4. The numerical control system of claim 3 further comprising at least one potentiometer connected to said register means and to said voltage to frequency conversion means and energized by said control voltage, and adapted to provide adjustment of said selected one particular frequency.

5. The numerical control system of claim 4 in which said computer is operable in accordance with said program at an arithmetic unit processing speed to cause said arithmetic unit to provide section end point data which are related to said coordinate axes and to define change point positions of said tool speed on said path, and said computer is also operable in accordance with said program to effect the selection of said one particular frequency and to change said speed control signals at predetermined ones of said change point positions, wherein said one particular frequency is established substantially independently of said arithmetic unit processing speed.

6. The numerical control system of claim 1, wherein said drive means is selectively operable in open and closed loop modes.

7. The numerical control system of claim 1, wherein said one of said configurations is a straight section, and the other configuration is a circular section.

8. The numerical control system of claim 6, wherein each control pulse corresponds to a predetermined travel along a respective coordinate axis, and further comprising a counter for the control pulses delivered to each of said drive means, whereby said drive means can resume moving said tool in said open loop mode following any interruption of said control pulses to said drive means free from causing any disturbance to said tool movement in accordance with said program, as the actual position of said tool need not be known in said open loop mode.

* * * * *